Nov. 28, 1933.   H. F. WILLIS, JR   1,937,451
ELECTRIC METER
Filed Oct. 17, 1931

Inventor
H. F. Willis, Jr
By Watson E. Coleman
Attorney

Patented Nov. 28, 1933

1,937,451

UNITED STATES PATENT OFFICE 1,937,451

ELECTRIC METER

Henry F. Willis, Jr., Carbondale, Ill.

Application October 17, 1931. Serial No. 569,523

5 Claims. (Cl. 171—268)

This invention relates to electrical measuring instruments and pertains particularly to an electric meter.

The primary object of the present invention is to provide a mechanism which is designed to be used for registering the amount of current flowing in two directions in a current carrying line, the device being designed primarily for registering the amount of energy passing in either direction through tie lines between generating units or plants or lines supplying the power to regenerative equipment, or on locomotives where current flows in one direction while the motors are pulling and is generated to flow in the opposite direction by the reversal of the motors when the engine is allowed to coast down a grade, and in any other capacities where it is desirable that a record be maintained of current passing in either direction through a line.

A further object of the invention is to provide an electric meter having two sets of gear trains, one for measuring incoming and the other for measuring outgoing current, in which the shifting of certain parts of the mechanism in accordance with the direction of flow of the current is accomplished through the medium of plates or disks controlled in the same manner as the usual driven and drag disks of a meter of ordinary type.

The present invention constitutes a modification of the structure shown in co-pending application, Serial No. 569,522, filed of even date herewith.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1:
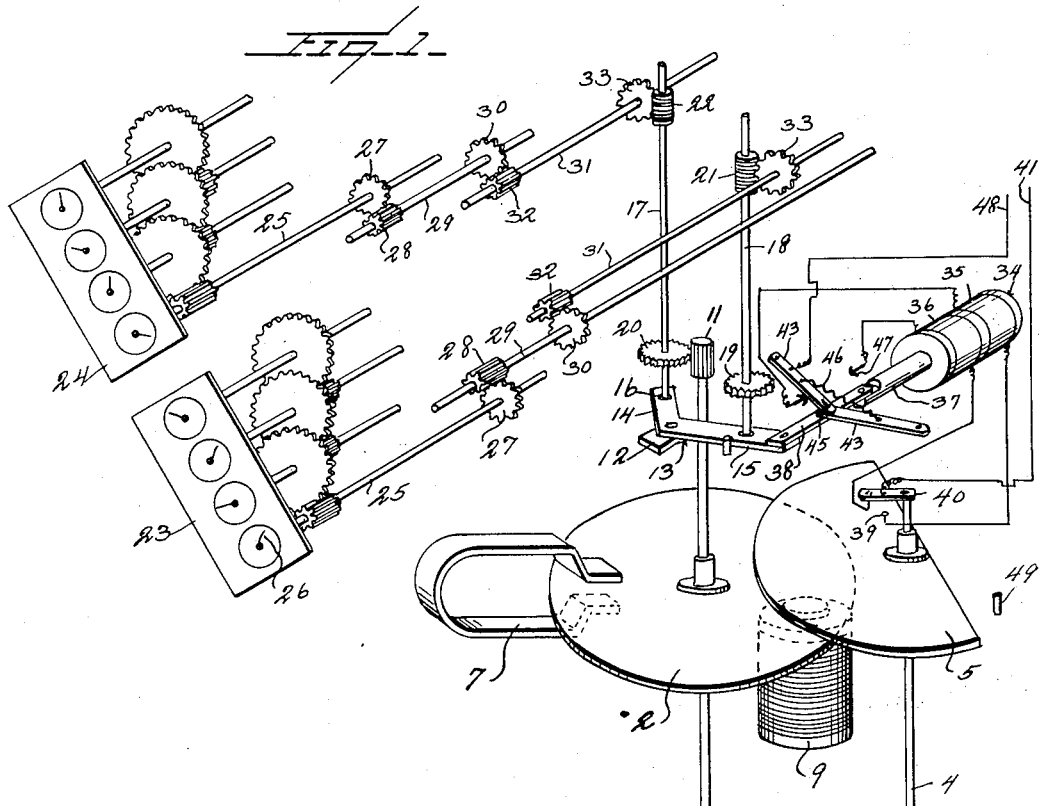
Figure 1 is a diagrammatic perspective view of the structure embodying the present invention.
Figure 2:
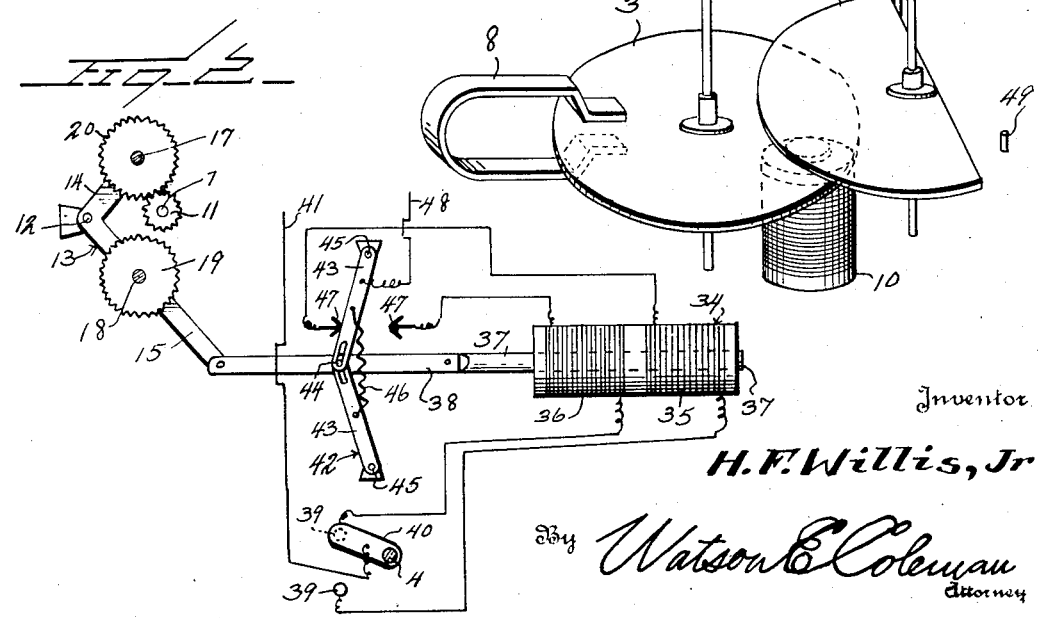
Figure 2 is a view showing in plan the oscillating gear supporting bar and the relation thereto of the solenoid control mechanism therefor.

Referring now more particularly to the drawing wherein like numerals of reference indicate corresponding parts throughout the several views, the present meter employs a vertically disposed disk shaft 1 which is mounted in suitable bearings (not shown) and which carries a pair of disks 2 and 3 which are of metal aluminum. In the ordinary type of watt-hour meter the upper one of these disks rotates between the poles of a pair of permanent magnets which exert a drag on the disk and thus control the rotation of the same and the operation of the mechanism associated therewith and the lower disk 3 forms a part of a motor which includes an iron or steel ring located above the disk and a pair of electromagnets disposed beneath the same, which magnets receive current from the line in which the meter is placed.

In the present invention the shaft 1 has mounted in parallel relation thereto, in suitable bearings, a shaft 4 which carries the two semicircular disks 5 and 6 which overlap or overlie the adjacent disks 2 and 3 and each of the disks 2 and 3 has associated therewith a permanent magnet and an electro-magnet. The permanent magnets are indicated by the numerals 7 and 8 and the electro-magnets are indicated by the numerals 9 and 10 and as shown, the permanent magnets are disposed upon the sides of their respective disks 2 and 3 remote from the semicircular disks 5 and 6, while the electro-magnets are located beneath the disks 2 and 3 at a point below the semi-circular disks 5 and 6 so that the latter disks will be influenced by the electro-magnets but will not be effected by the permanent ones.

The disks 5 and 6 will be referred to as the control disks and the shaft 4 upon which they are mounted will be referred to as the control shaft. At the upper end of the shaft 1 which may be referred to as the operating or driving shaft, there is mounted a gear pinion 11 and at a point below this pinion there is mounted upon a suitable bearing 12, a bar 13 which is formed to provide two angularly related portions 14 and 15, the mounting of the bar upon the pivot 12 being at the point of connection between these portions. Each of the portions 14 and 15 of the bar 13 carries a bearing 16 and in these bearings are stepped vertical shafts 17 and 18 which carry the gears 19 and 20 adjacent their lower ends and the worms 21 and 22 at their upper ends.

The gear pinion 11 which is mounted upon the operating or controlling shaft 1 is located between the gears 19 and 20 so that when oscillating the bar 13 in the proper direction one or the other of these gears may be brought into mesh with the pinion 11.

Each of the shafts 17 and 18 controls a registering mechanism or gear train, one of which is indicated by the numeral 23 while the other is indicated by the numeral 24 and each of these trains is made up of a series of shafts 25 which are connected by gear and pinion mechanisms, in the usual manner and which operate recording fingers upon registering dials 26. The first of the shafts 25 of each gear train is connected through the medium of a gear 27 with a pinion 28 upon a shaft 29 which shaft also carries a gear 30 which is in turn connected with a shaft 31 through the medium of a pinion 32 and this shaft 31 is connected by a gear 33 with one of the worms 21 or 22.

Mounted in any suitable manner in the plane of the bar 13 is a double solenoid which is indicated generally by the numeral 34. This solenoid has the two coils 35 and 36 through which works the core 37 to one end of which is attached the arm 38. The outer end of this arm 38 is pivotally connected with the portion 15 of the bar 13 so that when the core 37 is shifted the bar 13 will be oscillated to move the gears 19 and 20 relative to the worm 11. The coils 35 and 36 of the double solenoid are spaced apart so that the core may be drawn from one to the other thereof as one is energized and the other is deenergized.

Disposed adjacent the shaft 4 is a pair of contacts each of which is indicated by the numeral 39 and carried by this shaft is an arm 40 which is permanently in engagement with one of these contacts and each of these contacts 39 has one end of one of the coils 35—36 connected therewith. The arm 40 is connected with an electric wire 41 which leads from the current line in which the meter is mounted.

The bar 13 is secured in either of the two positions to which it may be moved by means of a holding device which is indicated generally by the numeral 42. This device comprises a pair of link members each of which is indicated by the numeral 43, which are arranged to extend transversely of the arm 38 and have their adjacent ends slidably secured to the arm as indicated at 44. The other or outer end of each of these links is pivotally mounted in any suitable manner as indicated at 45 and the links are connected together between points located substantially midway between their ends, by a spring 46. It will thus be seen that the links are permanently secured in angularly related condition by the spring which connects them together and the spring thus holds the arm firmly extended or retracted as the case may be. One of the arms 43 is located between a pair of electric contacts 47 to each of which is connected the other end of a coil of the solenoid 34 and this arm has permanently attached thereto the terminal of a wire 48 which joins the circuit with which the wire 41 is connected.

It will thus be seen that two switches control the coils of the solenoid 34 and the current operating either of these coils passes from the link 43 of the solenoid arm holding device, through one of the contacts 47 to a coil and from this coil to one of the contacts 39 through which it flows to the arm 40 and to the wire 41 thus completing the circuit for the energization of the coil.

In the operation of the present meter the disks 5 and 6, which are limited in their rotary or oscillatory movement by suitably positioned stop pins 49, control the solenoid coils 35 and 36 through the swinging of the switch arm 40 from one contact 39 to the other when the direction of current flow through the electro-magnet 9 and 10 changes. In this way the arm 38 is shifted to oscillate the bar 13 and thus move the gears 19 and 20 relative to the pinion 11, one gear being connected with the pinion, while the other is disengaged therefrom. With the parts in the position at present shown, should the current flow through the electro-magnets 9 and 10 change its direction so as to cause the disks 5 and 6 to swing around in a counter-clockwise direction, the switch arm 40 will come into contact with the contact point 39 which is at present unengaged and current will then flow through the line 41 to the coil 35 and from this coil through the arm 43 to the line 48 thus energizing the coil 35 and causing the gear 37 to be drawn inwardly, thereby shifting the gear controlling knuckle 42 so as to oscillate the gear 19 into engagement with the pinion 11 and remove the gear 20 from engagement therewith.

This will couple the registering mechanism 23 with the shaft 7 and uncouple the mechanism 24 from this shaft.

Having thus described the invention, what is claimed is:—

1. An electric meter, comprising a registering mechanism, a rotary disk carrying shaft, electric means for rotating said disk and shaft, shiftable gear means for coupling said shaft with said registering mechanism, an electrically actuated element for operating said shiftable gear means, and means governed by the direction of current flow through the electric means operating said disk for controlling the flow of current to the electrically actuated element controlling the shiftable gear means.

2. An electric meter for measuring the flow of current in two directions, comprising a pair of registering mechanisms, a rotary disk carrying shaft, electric means for rotating said disk and shaft in either direction, means for selectively operatively coupling said shaft with said mechanisms according to the direction of current flow through said electric operating means, an electrically operated element connected with said selective coupling means for the operation of the same, and means controlled by said disk controlling electrical element for actuating said electrical element in accordance with the direction of current flow through the meter.

3. An electric meter for measuring current flow in two directions, comprising a pair of electric registering mechanisms, a disk carrying shaft, electro-magnetic means for rotating said disk and shaft in either direction according to the direction of current flow therethrough, a gear carried by the shaft, a pair of gear elements, supporting means for said elements whereby either may be moved into engagement with said gear, a two coil solenoid having connection with said supporting means for shifting either of said elements into engagement with the gear, and means controlled by the current flowing through said electro-magnet elements, for energizing said coils in accordance with the direction of current flow through the electro-magnet elements.

4. An electric meter for measuring current flow in two directions, comprising a pair of registering mechanisms, a rotatable disk carrying shaft, electric means controlling the rotation of said disk and shaft, a gear element carried by the shaft, an oscillatable member mounted adjacent said shaft, a pair of gear carrying shafts carried by said member, said member upon oscillation in one direction bringing one of the gears of the supporting shaft in connection with the first mentioned gear, said gear carrying shafts each being coupled with a registering mechanism, a second disk carrying shaft having the disk thereof overlying the disk of the first shaft and controlled by the electric element controlling the first disk, said second disk having limited rotary movement, a two coil solenoid, an armature adapted to be attracted by either of said coils and having connection with said oscillatable supporting element, and a switch element controlled by said second disk carrying shaft for controlling the energization of said coils.

5. An electric meter for measuring current flow in two directions, comprising a pair of registering mechanisms, a rotatable disk carrying shaft, electric means controlling the rotation of said disk and shaft, a gear element carried by the shaft, an oscillatable member mounted adjacent said shaft, a pair of gear carrying shafts carried by said member, said member upon oscillation in one direction bringing one of the gears of the supporting shaft in connection with the first mentioned gear, said gear carrying shafts each being coupled with a registering mechanism, a second disk carrying shaft having the disk thereof overlying the disk of the first shaft and controlled by the electric element controlling the first disk, said second disk having limited rotary movement, a two coil solenoid, an armature adapted to be attracted by either of said coils and having connection with said oscillatable supporting element, a switch element controlled by said second disk carrying shaft for controlling the energization of said coils, and resilient means associated with said solenoid core for holding the same in either of the two positions to which it may be moved.

HENRY F. WILLIS, JR.